United States Patent
Fleming

[11] 4,087,809
[45] May 2, 1978

[54] MAGNETO-OPTIC BUBBLE DOMAIN HISTOGRAPH

[75] Inventor: David Leslie Fleming, Edina, Minn.

[73] Assignee: Sperry Rand Corporation, New York, N.Y.

[21] Appl. No.: 704,154

[22] Filed: Jul. 12, 1976

[51] Int. Cl.² .................................. G01D 7/00
[52] U.S. Cl. ...................... 340/324 R; 340/324 M; 350/151; 365/1
[58] Field of Search ........ 340/324 R, 324 M, 174 TF; 350/151

[56] References Cited

U.S. PATENT DOCUMENTS

| | | | |
|---|---|---|---|
| 3,754,121 | 8/1973 | Delay et al. | 340/324 R |
| 3,775,764 | 11/1973 | Gaur | 340/324 R |
| 3,815,107 | 6/1974 | Almasi | 350/151 |
| 3,824,570 | 7/1974 | De Bot | 340/174 TF |
| 3,835,465 | 9/1974 | Tannas et al. | 340/324 R |
| 3,971,887 | 7/1976 | Lin et al. | 340/324 R |

Primary Examiner—David L. Trafton
Attorney, Agent, or Firm—Kenneth T. Grace; William E. Cleaver; Marshall M. Truex

[57] ABSTRACT

A display system for providing a real-time, dynamic presentation of an analog signal waveform is disclosed. The system includes an A-D converter that is coupled to a 1-out-of-M decoder that, in turn, drives a serial string of bubble domain generators. The bubble domain generators generate moving columns of bubbles, the heights of the columns representing the amplitudes of the analog signal waveform at each of the associated sample times. The bubble domain memory plane is of a construction to permit the columns of moving bubbles to appear as moving columns of bright spots when seen by an observer utilizing a plane polarized light beam and an analyzer.

2 Claims, 5 Drawing Figures

MAGNETO-OPTIC BUBBLE DOMAIN HISTOGRAPH

BACKGROUND OF THE INVENTION

Since the early reports, see the publication "Properties and Device Applications of Magnetic Domains in Orthoferrites," A. H. Bobeck, The Bell System Technical Journal, Oct. 1967, pages 1901 – 1902, intensive studies have been conducted on cylindrical domains, single wall domains, bubble domains or more simply bubbles, in magnetizable films with perpendicular anisotropy. Since the early reports of A. H. Bobeck, many publications have been made available that deal extensively with the method of generating, propagating and detecting bubble domains and the various constructions of bubble domain memory planes—see the text "Magnetic Bubbles," T. H. O'Dell, John Wiley and Sons, 1974. More recent studies of the applications of bubble domains to novel magneto-optic systems have included the use of such devices as non-impact printers—see the publication "Novel Magneto-Optic Systems," R. Shahbender, IEEE Transactions on Magnetics, Volume MAG-10, No. 3, Sept. 1974, pages 575 – 580. The present invention is considered to be an improvement type invention of the above known prior art for providing a real-time presentation of an analog signal for visual analysis by a systems operator or observer.

SUMMARY OF THE INVENTION

In the present invention an analog signal is sampled in real-time and at regular sample time intervals. The sampled signal amplitudes are then digitized by an analog-to-digital converter and coupled to a 1-out-of-M decoder, the M outputs of which are each coupled to an associated one of M serially aligned bubble generators. For each sample signal amplitude, the bubble generators generate a column of bubbles of an associated height which columns are progressively moved across a bubble memory plane at the sampling frequency to appear as a moving display of the analog signal.

DESCRIPTION OF THE PREFERRED EMBODIMENT

Figure 1:
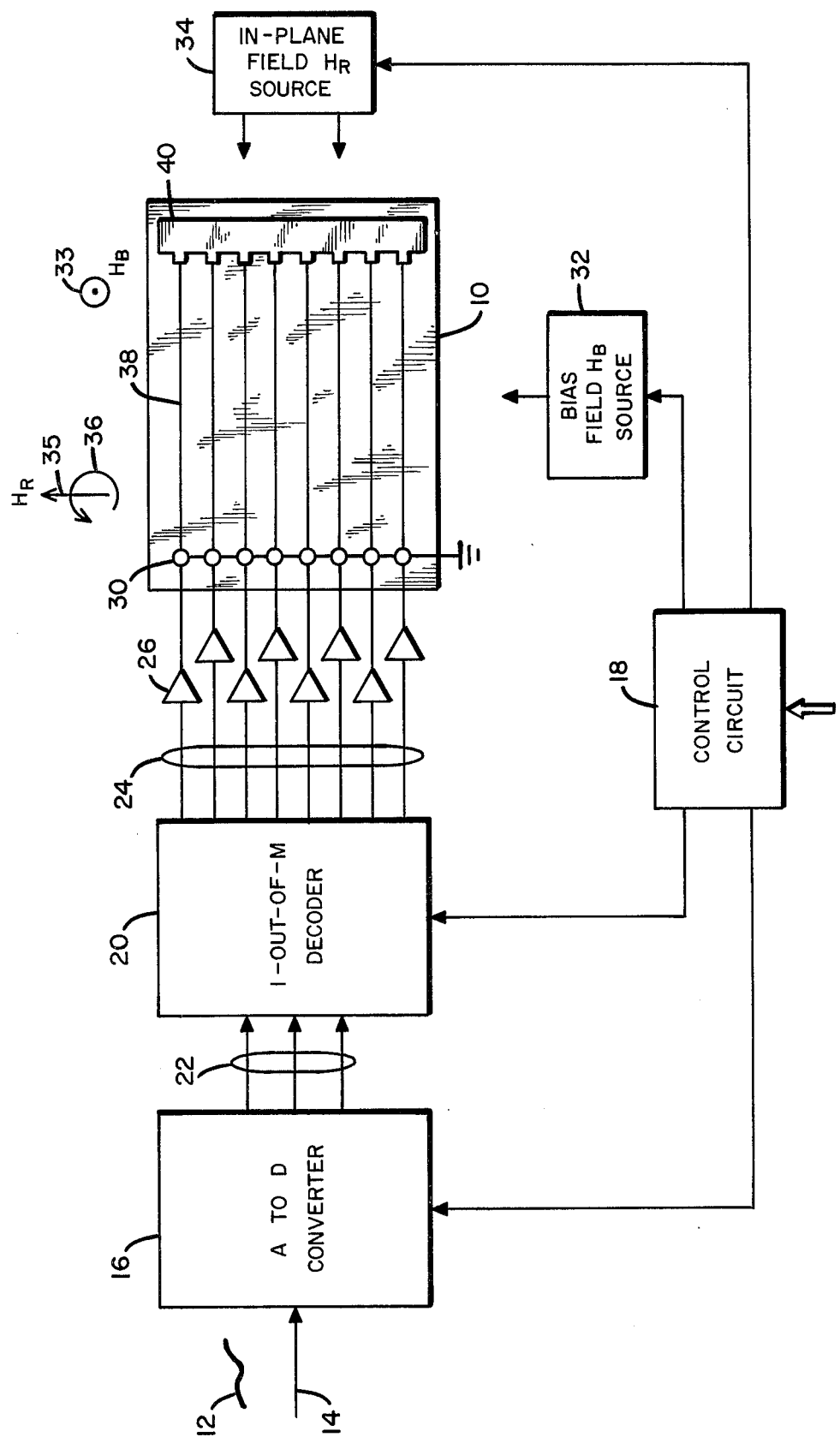
FIG. 1 is a block diagram of the magneto-optic bubble domain histograph of the present invention.

With particular reference to FIG. 1 there is presented a block diagram of the magneto-optic bubble domain histograph of the present invention. The analog signal 12 that is to be displayed by the bubble memory system on display 10 is, via line 14, coupled to A-D converter 16. The control circuit 18 couples the appropriate signals to A-D converter 16 causing it to sample analog signal 12 at regular sample time intervals at a frequency F. The digitized representations of the sampled signal amplitudes are, in turn, coupled to 1-out-of-M decoder 20 via cable 22. 1-out-of-M decoder 20, in turn, couples an appropriate current signal to one of the M output lines of cable 24 and the corresponding pulse generator 26, such as a Texas Instrument TI75325 memory driver, and thence to the bubble generators 30.

Control circuit 18 couples the appropriate signals to bais field $H_B$ source 32 and to in-plane field $H_R$ source 34 for generating the corresponding bias field $H_B$ represented by circle 33, which is directed normal to the plane of bubble memory plane 10 and in an upwardly oriented direction, while in-plane field $H_R$ source 34 couples to bubble memory plane 10 the in-plane field $H_R$ represented by vector 35 which is a rotating field that rotates in the plane of bubble memory plane 10 and in the manner as represented by line 36—see the L. J. Kochel, et al, patent application Ser. No. 611,105, filed Sept. 8, 1975 now U.S. Pat. No. 3,988,723.

For each sample signal amplitude, the bubble generators 30 generate a column of bubbles that are caused to move in a left to right direction along the corresponding guidance channels 38 by the in-plane field $H_R$ and the bias field $H_B$. Each column moves progressively from left to right, and at the righthand edge of bubble memory plane 10 it is destroyed or annihilated by annihilator 40. Control circuit 18, by causing the bubble generators 30 to generate a column of bubbles of a height that is associated with each sample signal amplitude, causes these associated bubbles to move across bubble memory plane 10 at the sampling frequency so as to appear as a moving display of the analog signal 12. Visual observation of the moving display of bubbles may be obtained by directing a plane-polarized, normally-incident, light beam upon the back surface of memory plane 10 and viewing the front surface of memory plane 10 via an analyzer—see the D. S. Lo, et al, U.S. Pat. No. 3,761,155.

Figure 2:
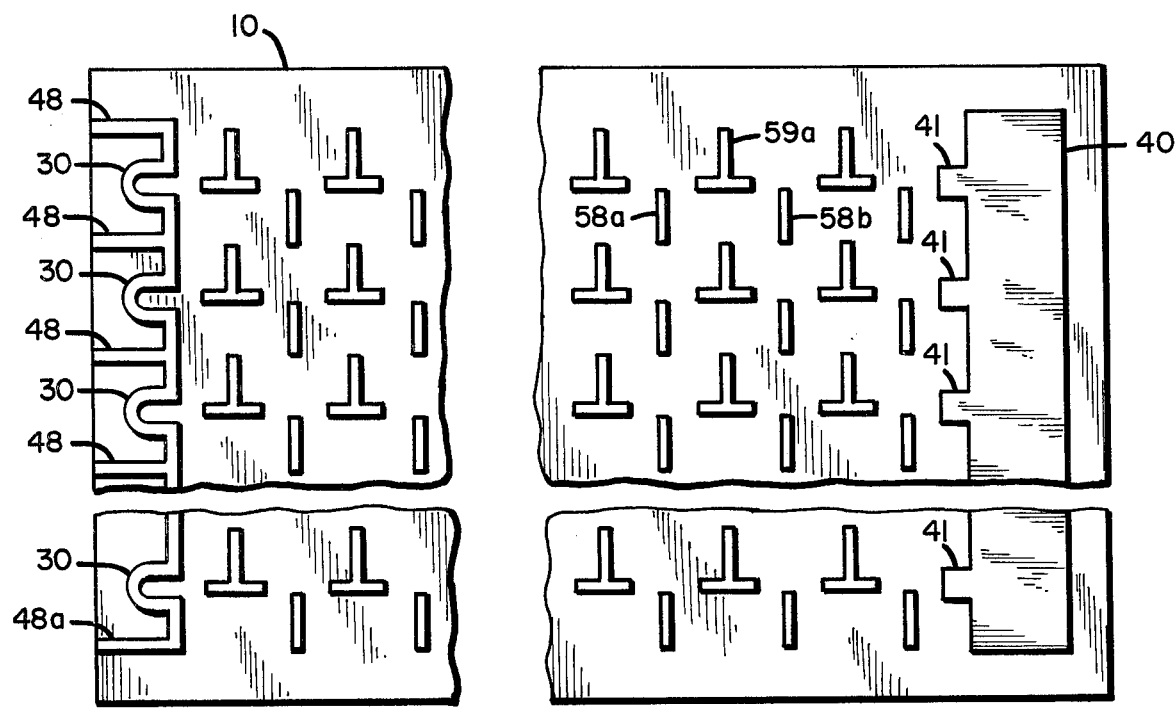
FIG. 2 is a more detailed plan view of the construction of the bubble memory plane that is utilized by the display system of FIG. 1.
Figure 3:
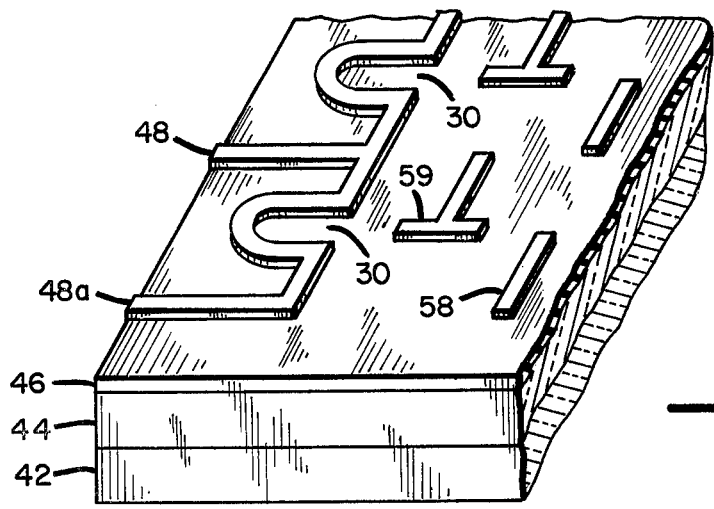
FIG. 3 is a perspective view of a preferred method of forming the bubble generator of the bubble memory plane of FIG. 2.

With particular reference to FIG. 2 there is presented a more detailed illustration of the bubble memory plane 10 of FIG. 1. With particular reference to FIG. 3 there is presented a perspective view of a more detailed representation of the bubble generators 30 of FIG. 2. Bubble memory plane 10 is illustrated as being comprised of a substrate member 42 of gadolinium gallium garnet (GGG) material of 5 millimeters (mm) in thickness upon which is formed by a liquid-phase epitaxial technique a bubble domain garnet layer 44 of 5 microns ($\mu$m) in thickness. Next, upon the bubble domain garnet layer 44 there is formed a silicon monoxide ($SiO_2$) insulative layer 46 of 5,000 Angstroms (A) in thickness.

Along the lefthand edge of bubble memory plane 10 there is formed upon the top surface of insulative layer 46 the pattern of gold hairpin bubble generators 30 and current taps 48 which are coupled to the associated output conductors of 1-out-of-M decoder 20 while current tap 48a may be utilized to couple the serial string of bubble generators 30 to a source of ground potential. Gold hairpin bubble generators 30 and the current taps 48 may be formed by well-known vapor deposition and/or etching techniques of 8,000 A in thickness. Also upon the top surface of insulative layer 46 there are formed the propagation paths or guidance channels 38 that are illustratively formed of a plurality of Permalloy T-bar elements of 5,000 A in thickness—see the publication "Magnetic Bubbles—An immerging New Memory Technology," A. H. Bobeck, et al, Proceedings of the IEEE, Volume 36, No. 8, Aug. 1975, pages 1176 – 1195. Along the righthand edge of bubble memory plane 10 there is formed the annihilator 40 of a 5,000 A thick layer of Permalloy having the M taps 41 each of which is associated with an associated one of the M bubble propagation paths 38. Annihilator 40 functions to capture and absorb the columns of bubbles when they are coupled to the associated taps 41 as they propagate from left to right and as they move along the associated bubble propagation paths 38.

Figure 4:
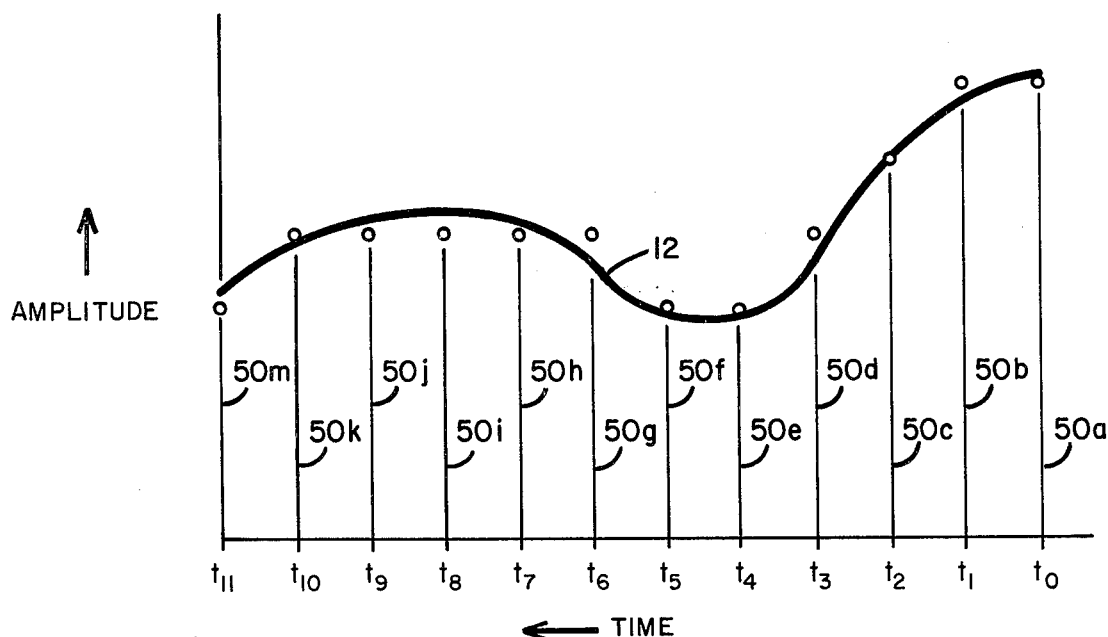
FIG. 4 is an illustration of an exemplary analog signal waveform and the corresponding digitized representations of the analog signal waveform taken at regular sample time intervals.
Figure 5:
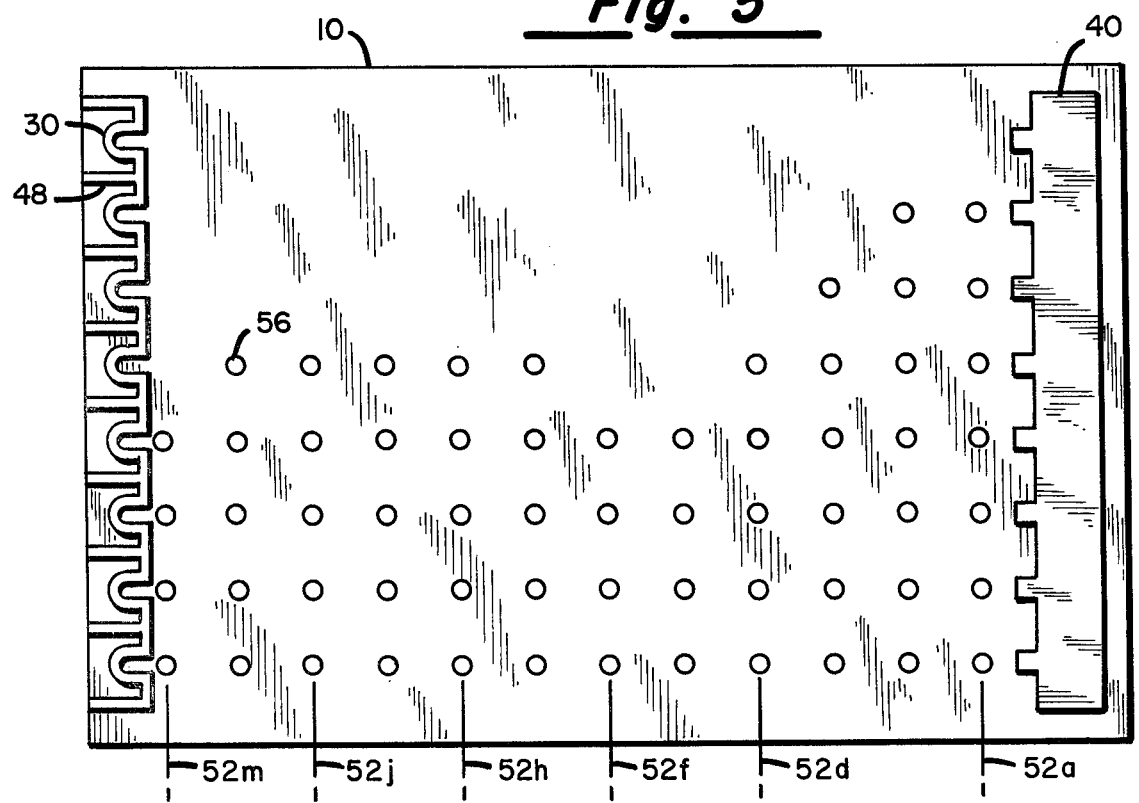
FIG. 5 is a plan view of the bubble memory plane of FIG. 2 illustrating the confirmation of the columns of bubbles corresponding to the digitized representation of the analog signal of FIG. 4.

With particular reference to FIGS. 4 and 5 there are presented an illustration of a typical analog signal 12 with the associated digitized sample signal amplitudes and a view of the columns of bubbles having heights associated with the respectively associated digitized sample time signal amplitudes of FIG. 4 as they would appear on the bubble memory plane 10 of FIG. 1. FIG. 4 illustrates the digitized sample signal amplitudes $50a - 50m$ taken at each of the corresponding sample times $t_0 - t_{11}$ for the corresponding amplitudes of the analog signal 12.

FIG. 5 illustrates the corresponding columns $52a - 52m$ for the corresponding digitized signal amplitudes $50a - 50m$, respectively, of FIG. 4. Columns $52a - 52m$ are at a frequency F, entered in a serial manner into bubble memory plane 10 at the lefthand edge by the corresponding serial string of bubble generators 30 and the individual bubble domains thereof are propagated along their respectively associated propagation paths 38. Control circuit 18 couples the appropriate control signals to in-plane field $H_R$ source 34 causing it to couple to bubble memory plane 10 a rotating in-plane field $H_R$, as represented by vector 35 in FIG. 1. Accordingly, the discrete bubble domains 56 of FIG. 5 are cuased to move along the associated bubble propagation paths 38, moving from each successive Permalloy, e.g., bar element, $58a$, $58b$ via the intermediate Permalloy T element, e.g., $59a$, during the time $t = 1/F$. Thus, the columns of bubbles 56 are caused to move in a left to righthand direction, each discrete bubble domain 56 traversing its own associated bubble propagation path 38 providing a real-time display of the analog signal 12.

What is claimed is:

1. A bubble histograph, comprising: waveform sampling means receiving an analog signal for sampling the analog signal waveform amplitude at a sampling frequency F and coupling, at said sampling signal F, an energizing signal to only a selected one of M output lines each of which M output lines is representative of a sampled signal wveform amplitude at an associated sample time;

a bubble memory plane comprising:
M horizontally-aligned bubble propagation paths;
M bubble generators, each one coupling a bubble to only an associated separate one of said propagation paths;
means for coupling each of said M bubble generators to only an associated separate one of said M output lines;
means for serially intercoupling said M bubble generators;

control means controlling said serially intercoupled M bubble generators for generating verticaly aligned, horizontally moving columns of bubbles at said frequency F, the heights of each of said moving columns of bubbles determined by the respectively associated energized one of said M decoder output lines, each discrete bubble of each column moving along its associated propagation path at said frequency F to form a real-time display of said analog signal.

2. A bubble histograph, comprising:
an analog-to-digital converter for receiving an analog signal and converging each of a plurality of sampled signal amplitudes of the analog signal waveform, at a sampling freqeuncy F, to its digital equivalent;

a 1-out-of-M decoder coupled to said anaog-to-digital converter for decoding said digital equivalent of each of said sampled signal amplitudes and energizing only a selected one of M decoder output lines;

a bubble memory plane comprising:
M horizontaly aligned bubble propagation paths;
M bubble generators, each one coupling a bubble to only an associated separate one of said propagation paths;
means for coupling each of said M bubble generators to only an associated separate one of said M decoder output lines;
means for serially intercoupling said M bubble generators;

control means controlling said serially intercoupled M bubble generators for generating vertically aligned, horizontally moving columns of bubbles at said frequency F, the heights of each of said moving columns of bubbles determined by the respectively associated energized one of said M decoder output lines, each discrete bubble of each column moving along its associated propagation path at said frequency F and forming a real-time display of said analog signal waveform.

* * * * *

UNITED STATES PATENT AND TRADEMARK OFFICE
CERTIFICATE OF CORRECTION

PATENT NO. : 4,087,809
DATED : May 2, 1978
INVENTOR(S) : David Leslie Fleming

It is certified that error appears in the above-identified patent and that said Letters Patent are hereby corrected as shown below:

Column 3, Line 48, delete "waveform".

Column 4, Line 14, "verticaly" should be

-- vertically --.

Column 4, Line 34, "horizontaly" should be

-- horizontally --.

Signed and Sealed this

Nineteenth Day of September 1978

[SEAL]

Attest:

RUTH C. MASON
*Attesting Officer*

DONALD W. BANNER
*Commissioner of Patents and Trademarks*